No. 734,582. PATENTED JULY 28, 1903.
C. B. MANSELL.
REIN HOLDER.
APPLICATION FILED APR. 13, 1900.
NO MODEL.
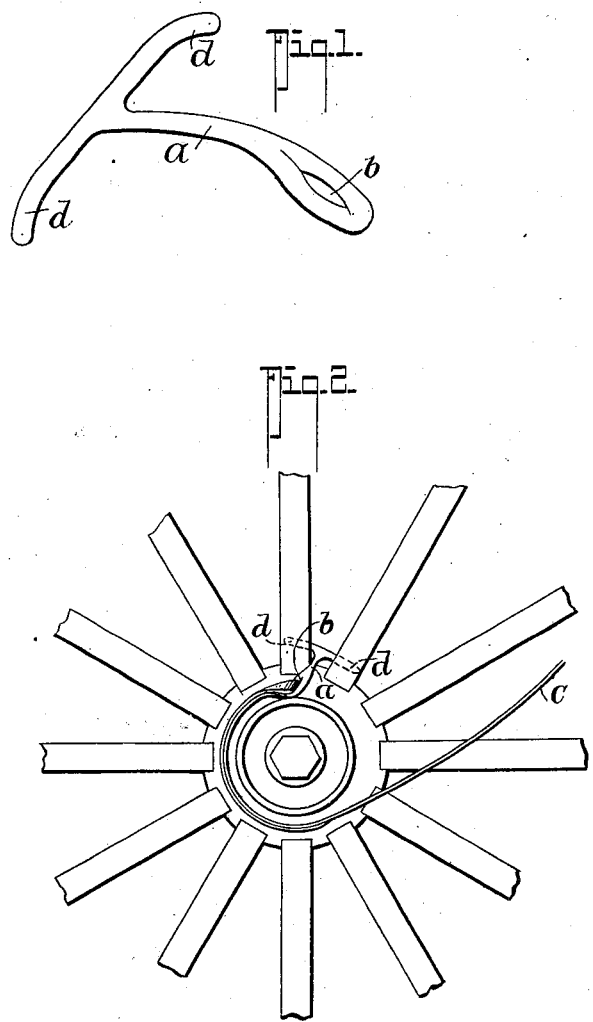
WITNESSES:
A. E. Dieterich
Louis Dieterich
INVENTOR
C. B. Mansell,
BY
Fred G. Dieterich
ATTORNEY No. 734,582. Patented July 28, 1903.

UNITED STATES PATENT OFFICE.

CALEB BINGHAM MANSELL, OF VANCOUVER, CANADA.

REIN-HOLDER.

SPECIFICATION forming part of Letters Patent No. 734,582, dated July 28, 1903.

Application filed April 13, 1900. Serial No. 12,722. (No model.)

*To all whom it may concern:*

Be it known that I, CALEB BINGHAM MANSELL, a citizen of the Dominion of Canada, residing at Vancouver, in the Province of British Columbia, Canada, have invented a new and useful Hitching Device, of which the following is a specification.

My invention relates to improvements in hitching devices; and my object is to provide a cheap and simple attachment for the tethering-strap that may from the vehicle be dropped between the spokes thereof and which prevents forward movement on the part of the animal more effectively than the heavy anchor-weight now in general use. I attain this object by the device illustrated in the accompanying drawings, in which—

Figure 1 is a view of the invention detached, and Fig. 2 shows its application when in use.

The invention consists of a T-shaped iron having its stem $a$ curved downward and provided with a longitudinally-extending slot $b$ therein for attaching the tethering-strap $c$, (see Fig. 2,) and the cross-arms of the T, as $d$, bend inward at their ends, so as to lie behind the spokes of the vehicle.

In the application of this simple and useful device the same is secured to the tethering-strap, which is connected to the bridle of the animal, and is carried in the vehicle until a stop is made, when it is dropped between the spokes at the top of the hub and the strap taking around the rear side of the said hub. Should the animal move forward, the strap will wind up and check the same, and by reason of the strap taking around the hub the T-shaped device cannot fall from between the spokes. Should the animal be in the habit of backing, by passing the strap one or more times around the hub before dropping the device between the spokes the hitching device cannot be detached without the wheel being turned and the strap unwound.

A particular advantage my invention has over others of this class is that all the slack of the check-rein or tether can be wound on the hub and fastened in such position by dropping the T-shaped iron between the spokes at the point it would be when the strap is wound.

Having now described my invention, what I claim is—

As a new article of manufacture, a hitching device, formed of a single T-shaped member, the shank $a$ of which is curved in a plane at right angles to the cross or head portion, whereby to snugly fit lengthwise upon the wheel-hub, the end of said shank having a longitudinally-extending slot $b$, to receive the hitching-strap, the head of said member being curved to fit closely and transversely over the hub, the ends of said head being curved inward toward the shank, whereby to fit closely over and behind two adjacent spokes, all being arranged substantially as shown and for the purposes described.

Vancouver, British Columbia, April 6, 1900.

CALEB BINGHAM MANSELL.

In presence of—
 ROWLAND BRITTAIN,
 W. G. TRETHEWEY.